US010443617B2

(12) United States Patent
Finnigan et al.

(10) Patent No.: US 10,443,617 B2
(45) Date of Patent: Oct. 15, 2019

(54) FUNCTIONALLY GRADED COMPOSITE FAN CONTAINMENT CASE

(71) Applicant: UNITED TECHNOLOGIES CORPORATION, Hartford, CT (US)

(72) Inventors: Peter Finnigan, Higganum, CT (US); Sreenivasa R. Voleti, Farmington, CT (US); Larry Foster, South Glastonbury, CT (US); Darin S. Lussier, Berlin, CT (US); Gulperi Aksel, Niskayuna, NY (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 329 days.

(21) Appl. No.: 15/075,245

(22) Filed: Mar. 21, 2016

(65) Prior Publication Data

US 2016/0281738 A1 Sep. 29, 2016

Related U.S. Application Data

(63) Continuation of application No. 13/540,074, filed on Jul. 2, 2012, now abandoned.

(51) Int. Cl.
*B32B 1/08* (2006.01)
*F04D 29/52* (2006.01)
(Continued)

(52) U.S. Cl.
CPC ............ *F04D 29/526* (2013.01); *B29C 70/24* (2013.01); *F01D 21/045* (2013.01);
(Continued)

(58) Field of Classification Search
CPC ...... B32B 1/08; B32B 17/04; B32B 2260/023; B32B 2307/558; B32B 2605/18
See application file for complete search history.

(56) References Cited

U.S. PATENT DOCUMENTS 4,452,563 A   6/1984 Belanger et al.
4,622,091 A   11/1986 Letterman
(Continued)

FOREIGN PATENT DOCUMENTS

EP   2071132 A2   6/2009
EP   2218810 A1   8/2010
(Continued)

OTHER PUBLICATIONS

NASA Technical Memorandum—Concepts for the Development of Light-Weight Composite Structures for Rotor Burst Containing, Arthur G. Holms, Mar. 29, 1977.
(Continued)

*Primary Examiner* — Andrew T Piziali
(74) *Attorney, Agent, or Firm* — Carlson, Gaskey & Olds, P.C.

(57) ABSTRACT

A fan containment case for a gas turbine engine includes a first inner layer and a second layer outside the first inner layer, where the second layer is made of a first material having a first fabric architecture. The fan containment case also includes a third layer outside of the second layer, where the third layer is made of a second material having a second fabric architecture, and at least one of the first material and the first fabric architecture of the second layer is different from the second material and the second architecture, respectively, of the third layer. A fourth outer layer is located outside of the third layer.

19 Claims, 3 Drawing Sheets

(51) Int. Cl.
*F01D 21/04* (2006.01)
*B29C 70/24* (2006.01)

(52) U.S. Cl.
CPC .... *F05D 2220/32* (2013.01); *F05D 2300/224* (2013.01); *F05D 2300/6012* (2013.01); *F05D 2300/6031* (2013.01); *F05D 2300/6034* (2013.01); *F05D 2300/614* (2013.01); *Y02T 50/672* (2013.01)

(56) References Cited

U.S. PATENT DOCUMENTS

| | | | |
|---|---|---|---|
| 5,474,043 | A | 12/1995 | Mallen |
| 5,485,723 | A | 1/1996 | McCoy et al. |
| 5,824,260 | A | 10/1998 | Sauerhoefer |
| 5,989,679 | A | 11/1999 | Sauerhoefer |
| 6,364,603 | B1 | 4/2002 | Czachor et al. |
| 6,372,072 | B1* | 4/2002 | Healey .............. B32B 5/26 156/148 |
| 6,627,833 | B2 | 9/2003 | Varsell et al. |
| 6,637,186 | B1 | 10/2003 | Van Duyn |
| 6,652,222 | B1 | 11/2003 | Wojtyczka et al. |
| 6,699,109 | B1 | 3/2004 | Fox et al. |
| 6,838,157 | B2 | 1/2005 | Subramanian |
| 6,866,478 | B2 | 3/2005 | Fabian et al. |
| 7,246,990 | B2 | 7/2007 | Xie et al. |
| 7,267,868 | B2 | 9/2007 | Gallet et al. |
| 7,302,989 | B1 | 12/2007 | Kamel et al. |
| 7,390,161 | B2 | 6/2008 | Xie et al. |
| 7,413,001 | B2 | 8/2008 | Wang et al. |
| 7,572,524 | B2 | 8/2009 | Sabol et al. |
| 7,582,359 | B2 | 9/2009 | Sabol et al. |
| 7,618,712 | B2 | 11/2009 | Sabol et al. |
| 7,635,119 | B1 | 12/2009 | Patel |
| 7,841,368 | B2 | 11/2010 | McMasters et al. |
| 7,905,972 | B2 | 3/2011 | Xie et al. |
| 7,967,570 | B2 | 6/2011 | Shi et al. |
| 8,004,423 | B2 | 8/2011 | Mitchell et al. |
| 8,016,543 | B2 | 9/2011 | Braley et al. |
| 8,021,102 | B2 | 9/2011 | Xie et al. |
| 8,028,802 | B2 | 10/2011 | Durchholz et al. |
| 8,043,684 | B2 | 10/2011 | Shi |
| 8,061,142 | B2 | 11/2011 | Kastrup et al. |
| 8,092,169 | B2 | 1/2012 | Cloft et al. |
| 8,128,866 | B2 | 3/2012 | Shi |
| 8,171,734 | B2 | 5/2012 | McMasters et al. |
| 8,333,558 | B2 | 12/2012 | Finn et al. |
| 8,403,624 | B2 | 3/2013 | Xie et al. |
| 8,567,467 | B2 | 10/2013 | Maheshwari et al. |
| 8,647,072 | B2 | 2/2014 | McMillan |
| 9,017,814 | B2 | 4/2015 | Xie et al. |
| 9,097,139 | B2 | 8/2015 | McMillan |
| 2004/0016239 | A1 | 1/2004 | Fabian et al. |
| 2004/0043703 | A1 | 3/2004 | Fox et al. |
| 2005/0198967 | A1 | 9/2005 | Subramanian |
| 2005/0287386 | A1 | 12/2005 | Sabol et al. |
| 2006/0056959 | A1 | 3/2006 | Sabol et al. |
| 2006/0056960 | A1 | 3/2006 | Sabol et al. |
| 2006/0093847 | A1 | 5/2006 | Hornick et al. |
| 2007/0084047 | A1 | 4/2007 | Lange et al. |
| 2007/0277954 | A1 | 12/2007 | Kamel et al. |
| 2008/0128073 | A1 | 6/2008 | Xie et al. |
| 2008/0206048 | A1* | 8/2008 | Coupe .............. B29C 70/24 415/200 |
| 2009/0028697 | A1 | 1/2009 | Shi et al. |
| 2009/0067979 | A1* | 3/2009 | Braley .............. F01D 21/045 415/9 |
| 2009/0098337 | A1 | 4/2009 | Xie et al. |
| 2009/0183850 | A1 | 7/2009 | Morrison et al. |
| 2009/0255262 | A1 | 10/2009 | McMasters et al. |
| 2009/0293497 | A1 | 12/2009 | Cloft |
| 2009/0321178 | A1 | 12/2009 | Durchholz et al. |
| 2010/0025001 | A1 | 2/2010 | Lee et al. |
| 2010/0068051 | A1 | 3/2010 | Cloft et al. |
| 2010/0077721 | A1 | 4/2010 | Marshall |
| 2010/0115693 | A1 | 5/2010 | Kirby |
| 2010/0115964 | A1 | 5/2010 | Kirby |
| 2010/0117859 | A1 | 5/2010 | Mitchell et al. |
| 2010/0226756 | A1 | 9/2010 | Mitchell et al. |
| 2011/0016717 | A1 | 1/2011 | Morrison et al. |
| 2011/0052383 | A1 | 3/2011 | Lussier |
| 2011/0099809 | A1 | 5/2011 | Hovel et al. |
| 2011/0099810 | A1 | 5/2011 | Stankowski et al. |
| 2011/0138769 | A1 | 6/2011 | Costa et al. |
| 2011/0247590 | A1 | 10/2011 | Donovan |
| 2011/0311389 | A1 | 12/2011 | Ryan et al. |
| 2012/0000072 | A9 | 1/2012 | Morrison et al. |
| 2012/0003086 | A1 | 1/2012 | Morris et al. |
| 2012/0076647 | A1 | 3/2012 | Robertson, Jr. et al. |
| 2012/0099975 | A1 | 4/2012 | Robertson, Jr. et al. |
| 2012/0134774 | A1 | 5/2012 | Clark |
| 2013/0134621 | A1 | 5/2013 | Tsotsis et al. |

FOREIGN PATENT DOCUMENTS

| | | |
|---|---|---|
| EP | 2290197 | 3/2011 |
| WO | 98/10128 A1 | 3/1998 |
| WO | 2001092002 | 12/2001 |
| WO | 2013/123195 A1 | 8/2013 |

OTHER PUBLICATIONS

Focus on Design—Composite fan blade containing case, www.compositesworld.com, May 2005.

Development of Textile Reinforced Composit4es for Aircraft Structures, H. Benson Dexter, Oct. 12, 1998.

NASA/TM—Design and Testing of Braided Composite Fan Case Materials and Components, Gary D. Roberts and J. Michael Pereira, Oct. 2009.

NASA Technical Memorandum—Composite Containment Systems for Jet Engine Fan Blades, Feb. 16, 1981.

NASA/TM—An Assessment of the State-of-the-Art in the Design and Manufacturing of Large Composite Structures for Aerospace Vehicles, Apr. 2001.

NASA/TM—Impact Testing and Analysis of Composites for Aircraft Engine Fan Cases, Apr. 2002.

NASA/TM—Modification of a Macromechanical Finite-Element Based Model for Impact Analysis of Triaxially-Braided composites, Dec. 2010.

Experimental Techniques for Evaluating the Effects of Aging on Impact and High Strain Rate Properties of Triaxial Braided Composite Materials, Aug. 2010.

NASA/TM—Effect of Microscopic Damage Events on Static and Ballistic Impact Strength of Triaxial Braid Composites, Mar. 2010.

NASA/TM—Improved Subcell Model for the Prediction of Braided Composite Response, Jun. 2013.

A&P Technology—Applications in Braid Technology, Jason Scharf, Mar. 20, 2008.

A&P Technology—GE Aviation's first GEnx engine with braided composite fan case delivered, Feb. 21, 2016.

HEXCEL—Technical Fabrics Handbook, HexForce Reinforcements.

Reinforced Plastics, Wing Worker for the World, May/Jun. 2010.

GKN PLC Annual Report, 2004—A Time of Transition.

IHI Engineering Review—Development of Three Dimensional Composite with Extremely Low Thermal Expansion Properties, vol. 40, No. 1, Feb. 2007.

ResearchGate—Predicting Cure-Induced Microcracking in 3D Woven Composites with Realistic Simulation Technology, Jan. 2012.

Rapid Assembly of Fiber Preforms Using 3D Woven Components, Mike McClain and Jonathan Goering, 2012.

Mesomechanical Model for Failure Study of Two Dimensional Triaxial Braided Composite Materials, Dissertation of Xuetao Li, dated Dec. 2010.

Chia, Elvin S.M. et al., "3-D Braided/RTM Composites: Smart RTM Fabrication & Compression Study" Technical Paper, Conference ICCM-14, Jul. 14-18, 2003, San Diego, California.

(56) References Cited

OTHER PUBLICATIONS

Hess, Joseph P., "Braided Composite Structures" Technical Paper, Conference Fabricating Composites '88, Sep. 12-15, 1988, Philadelphia, Pennsylvania.
International Search Report and Written Opinion for PCT Application No. PCT/US2013/047523 dated Oct. 10, 2013.
International Preliminary Report on Patentability for International Application No. PCT/US2013/047523 dated Jan. 15, 2015.
Supplementary European Search Report for EP Application No. 13813106.5 dated Jul. 8, 2015.

\* cited by examiner

FUNCTIONALLY GRADED COMPOSITE FAN CONTAINMENT CASE

CROSS-REFERENCE TO RELATED APPLICATION

This application is a continuation of U.S. application Ser. No. 13/540,074, filed Jul. 2, 2012.

BACKGROUND OF THE INVENTION

Fan containment cases (FCC) contain fan blades during a blade out event. Various types of construction have been used for fan containment case designs. Fan containment cases can include a hardwall construction that contains a released fan blade or a softwall construction that consists of an inner structure that carries normal operational loads combined with an outer fabric wrap that catches and contains the released fan blade. Composite fan containment case designs are generally lighter than metallic designs.

SUMMARY OF THE INVENTION

A fan containment case for a gas turbine engine includes a first inner layer and a second layer outside the first inner layer, where the second layer is made of a first material having a first fabric architecture. The fan containment case also includes a third layer outside of the second layer, where the third layer is made of a second material having a second fabric architecture, and at least one of the first material and the first fabric architecture of the second layer is different from the second material and the second architecture, respectively, of the third layer. A fourth outer layer is located outside of the third layer.

In a further non-limited fan containment case of any of the foregoing method embodiments, the fan containment case may include a first inner layer that is an aramid fiber layer.

In a further non-limited fan containment case of any of the foregoing method embodiments, the fan containment case may include a first inner layer that has a fabric architecture of a three dimensional weave.

In a further non-limited fan containment case of any of the foregoing method embodiments, the fan containment case may include a first material of a second layer that is a hybrid carbon-fiberglass.

In a further non-limited fan containment case of any of the foregoing method embodiments, the fan containment case may include a first architecture of a second layer that is a triaxial braid.

In a further non-limited fan containment case of any of the foregoing method embodiments, the fan containment case may include a triaxial braid including first fibers, second fibers and third fibers, and the second fibers and third fibers extend at a weave angle of about +/−60° relative to the first fibers.

In a further non-limited fan containment case of any of the foregoing method embodiments, the fan containment case may include first fibers that are carbon fibers, and the second fibers and the third fibers are fiberglass fibers.

In a further non-limited fan containment case of any of the foregoing method embodiments, the fan containment case may include a second material of a third layer that is carbon.

In a further non-limited fan containment case of any of the foregoing method embodiments, the fan containment case may include a second architecture of a third layer that is a triaxial braid.

In a further non-limited fan containment case of any of the foregoing method embodiments, the fan containment case may include a triaxial braid including first fibers, second fibers and third fibers, and the second fibers and third fibers extend at a weave angle of about +/−45° relative to the first fibers.

In a further non-limited fan containment case of any of the foregoing method embodiments, the fan containment case may include first fibers, second fibers and third fibers that are carbon fibers.

In a further non-limited fan containment case of any of the foregoing method embodiments, the fan containment case may include a fourth outer layer that is made of carbon.

In a further non-limited fan containment case of any of the foregoing method embodiments, the fan containment case may include a fourth outer layer that has a fabric architecture of a non-crimp fabric.

A fan containment case for a gas turbine engine includes a first inner layer of an aramid fiber and a second layer outside the first inner layer, where the second layer is made of a hybrid carbon-fiberglass having a first fabric architecture. The fan containment case includes a third layer outside of the second layer, where the third layer is made of carbon and has second fabric architecture, and the first fabric architecture is different from the second architecture. A fourth outer layer is located outside of the third layer and is a made of carbon.

In a further non-limited fan containment case of any of the foregoing method embodiments, the fan containment case may include a second layer having a first architecture having a triaxial braid including first fibers, second fibers and third fibers, and the second fibers and third fibers extend at a weave angle of about +/−60° relative to the first fibers.

In a further non-limited fan containment case of any of the foregoing method embodiments, the fan containment case may include first fibers that are carbon fibers, and second fibers and third fibers that are fiberglass fibers.

In a further non-limited fan containment case of any of the foregoing method embodiments, the fan containment case may include a second layer having a second architecture having a triaxial braid including first fibers, second fibers and third fibers, and the second fibers and third fibers extend at a weave angle of about +/−45° relative to the first fibers.

In a further non-limited fan containment case of any of the foregoing method embodiments, the fan containment case may include first fibers, second fibers and third fibers that are carbon fibers.

In a further non-limited fan containment case of any of the foregoing method embodiments, the fan containment case may include a first inner layer having a fabric architecture of a three dimensional weave.

In a further non-limited fan containment case of any of the foregoing method embodiments, the fan containment case may include a fourth outer layer having a fabric architecture of a non-crimp fabric.

These and other features of the present invention can be best understood from the following specification and drawings, the following of which is a brief description.

DETAILED DESCRIPTION OF THE PREFERRED EMBODIMENTS

Figure 1:
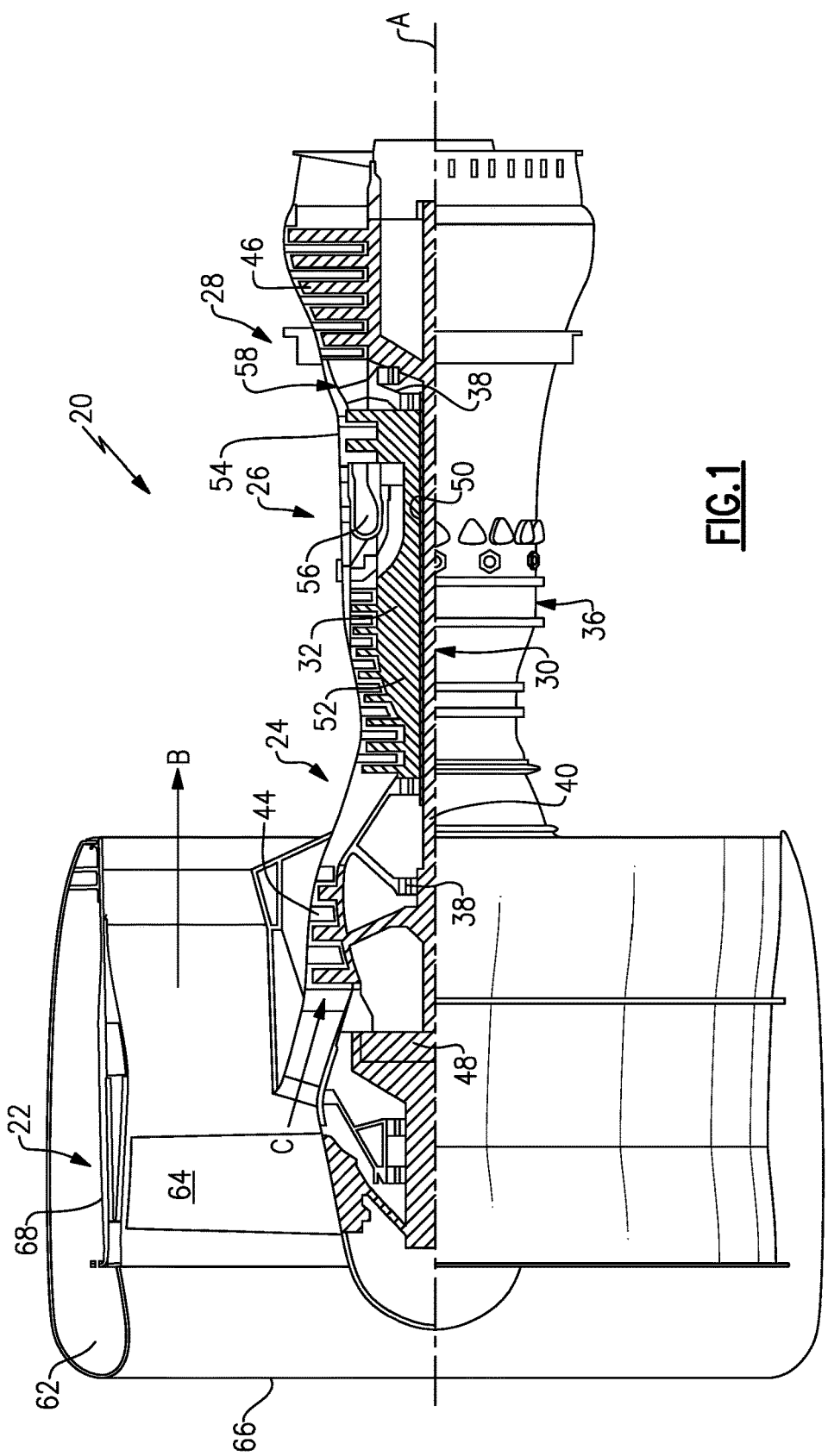
FIG. 1 illustrates a schematic view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features.

Although depicted as a turbofan gas turbine engine in the disclosed non-limiting embodiment, it should be understood that the concepts described herein are not limited to use with turbofans as the teachings may be applied to other types of turbine engines including three-spool or geared turbofan architectures.

The fan section 22 drives air along a bypass flowpath B while the compressor section 24 drives air along a core flowpath C for compression and communication into the combustor section 26 then expansion through the turbine section 28.

The fan section 22 is disposed within a nacelle 62 and includes a plurality of fan blades 64. The nacelle 62 defines an inlet 66 for incoming airflow. A fan containment case 68 is disposed within the nacelle 62 and proximate to the fan blades 64 within the fan section 22.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and a high pressure turbine 54.

A combustor 56 is arranged between the high pressure compressor 52 and the high pressure turbine 54.

A mid-turbine frame 58 of the engine static structure 36 is arranged generally between the high pressure turbine 54 and the low pressure turbine 46. The mid-turbine frame 58 further supports bearing systems 38 in the turbine section 28.

The inner shaft 40 and the outer shaft 50 are concentric and rotate via bearing systems 38 about the engine central longitudinal axis A, which is collinear with their longitudinal axes.

The core airflow C is compressed by the low pressure compressor 44, then the high pressure compressor 52, mixed and burned with fuel in the combustor 56, then expanded over the high pressure turbine 54 and low pressure turbine 46. The mid-turbine frame 58 includes airfoils 60 which are in the core airflow path. The turbines 46, 54 rotationally drive the respective low speed spool 30 and high speed spool 32 in response to the expansion.

The engine 20 is in one example a high-bypass geared aircraft engine. In a further example, the engine 20 bypass ratio is greater than about six (6:1) with an example embodiment being greater than ten (10:1). The geared architecture 48 is an epicyclic gear train (such as a planetary gear system or other gear system) with a gear reduction ratio of greater than about 2.3 (2.3:1). The low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle.

In one disclosed embodiment, the engine 20 bypass ratio is greater than about ten (10:1), and the fan diameter is significantly larger than that of the low pressure compressor 44. The low pressure turbine 46 has a pressure ratio that is greater than about five (5:1). The geared architecture 48 may be an epicycle gear train, such as a planetary gear system or other gear system, with a gear reduction ratio of greater than about 2.5 (2.5:1). It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 feet, with the engine at its best fuel consumption, also known as bucket cruise Thrust Specific Fuel Consumption ("TSFC"). TSFC is the industry standard parameter of lbm of fuel being burned divided by lbf of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.45.

"Low corrected fan tip speed" is the actual fan tip speed in feet per second divided by an industry standard temperature correction of $[(Tambient\ deg\ R)/518.7)^{0.5}]$. The "Low corrected fan tip speed" as disclosed herein according to one non-limiting embodiment is less than about 1150 feet per second (351 meters per second).

Figure 2:
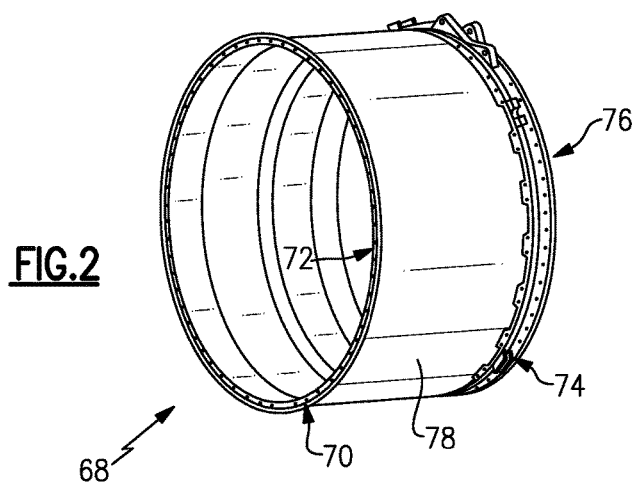
FIG. 2 illustrates a perspective view of a fan containment case.

FIG. 2 illustrates the fan containment case 68. The fan containment case 68 includes an attachment flange 70 at a front 72 of the fan containment case 68 and a mounting ring 74 at a rear 76 of the fan containment case 68 to secure the fan containment case 68 to another engine structure. The fan containment case 68 includes a structure 78 including a plurality of layers 80, 84, 92 and 94 that form a generally cylindrical geometry.

Figure 3:
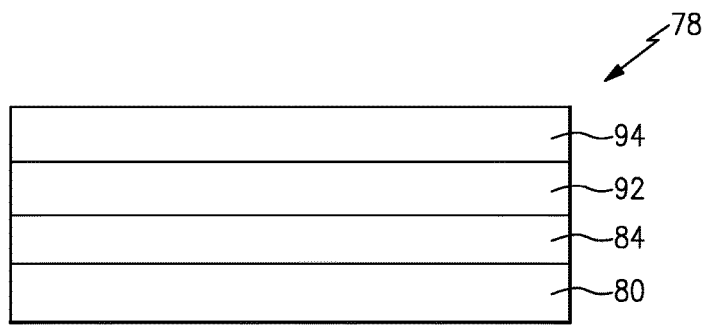
FIG. 3 illustrates a cross-sectional view of the fan containment case showing layers.

FIG. 3 schematically illustrates a cross-sectional view of the structure 78 of the fan containment case 68.

Figure 4:
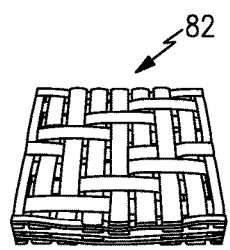
FIG. 4 illustrates a view of a fabric of a three dimensional weave.
Figure 7:
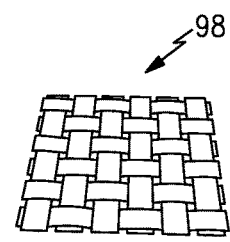
FIG. 7 illustrates a view of a fabric of a two dimensional weave.

In one example, the structure 78 includes a first inner layer or layers 80 that defines an inner diameter of the fan containment case 68. In one example, the first inner layer 80 is made from aramid (aromatic polyamide) fibers. In one example, the aramid fiber is Kevlar®, a registered trademark of E. I. du Pont de Nemours and Company of Wilmington, Del. In one example, as shown in FIG. 4, the first inner layer 80 is a fabric having a fabric architecture of a three dimensional weave 82. The first inner layer 80 is in a blade impact zone along an inner diameter of the fan containment case 68. The three dimensional weave 82 provides through-thickness reinforcement and improved impact resistance. Although a fabric having a fabric architecture of a three dimensional weave 82 has been illustrated and described, other fabric architectures can be employed. For example, the fabric architecture of the first inner layer 80 can be a triaxial braid 86 (shown in FIG. 5), a two dimensional weave 98 (shown in FIG. 7), or a combination of several fabric architectures.

The first inner layer 80 has improved through-thickness reinforcement to withstand the direct impact of a blade out event, although the fan blade 64 may penetrate the first inner layer 80.

Figure 5:
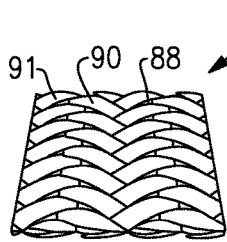
FIG. 5 illustrates a view of fabric of a triaxial braid.

A second layer or layers 84 is located outwardly from the first inner layer 80. In one example, the second layer 84 is made of hybrid carbon-fiberglass, and the second layer 84 has a fabric architecture of a triaxial braid 86, as shown in FIG. 5. In one example, the hybrid carbon-fiberglass triaxial braid 86 includes first fibers 88, second fibers 90 and third fibers 91. The second fibers 90 and the third fibers 91 extend at a weave angle of about +/−60° relative to the first fibers 88. In one example, the first fibers 88 are carbon fibers, and the second fibers 90 and the third fibers 91 are fiberglass fibers. The second layer 84 provides for further energy absorption and dissipation capability by combining the damage toughness and strain capabilities of the fiberglass fibers in one direction with the strength and stiffness of the carbon fibers in another directions within the same layer of triaxial braid 86 fabric.

A third layer or layers 92 is located outwardly from the second layer 84. In one example, the second layer 84 is made of carbon, and the third layer 92 has a fabric architecture of a triaxial braid 86 (shown in FIG. 5). In one example, the hybrid carbon-fiberglass triaxial braid 86 includes first fibers 88, second fibers 90 and third fibers 91. The second fibers 90 and the third fibers 91 extend at a weave angle of about +/−45° relative to the first fibers 88. In one example, the first fibers 88, the second fibers 90 and the third fibers 91 are carbon fibers.

That is, the weave angle of the triaxial braid 86 of the third layer 92 is different from the weave angle of the triaxial braid 86 of the second layer 84. Additionally, the materials of the third layer 92 are different from the materials of the second layer 84. The layers 84 and 96 are "functionally graded" to more efficiently absorb and dissipate the impact energy.

Additionally layers of triaxial braid 86 having different weave angles, different architectures or different materials can be employed in addition to the second layer 84 and the fourth outer layer 94 to improve load spreading and optimize the strength and stiffness of the fan containment case 68.

The fabric architecture, specifically the weave angle, can be varied in any subsequent outer layers to further tailor and optimize the structure properties of the fan containment case 68.

Figure 6:
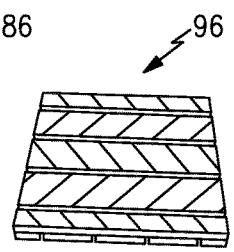
FIG. 6 illustrates a view of a non-crimp fabric.

The fourth outer layer or layers 94 is located outwardly from the third layer 92. In one example, the fourth outer layer 94 is made of carbon. In one example, the fourth outer layer 94 has a fabric architecture including of a non-crimp fabric 96, as shown in FIG. 6. The non-crimp fabric 96 can also be used in local regions to improve in-plane structural properties. For example, the non-crimp fabric 96 can be used in flange regions for higher bearing strength. In one example, each layer of non-crimp fabric 96 of has a thickness of about 0.01 to 0.02 inch per layer. In another example, the fourth outer layer 94 has a triaxial braid architecture, as shown in FIG. 5.

Figure 8:
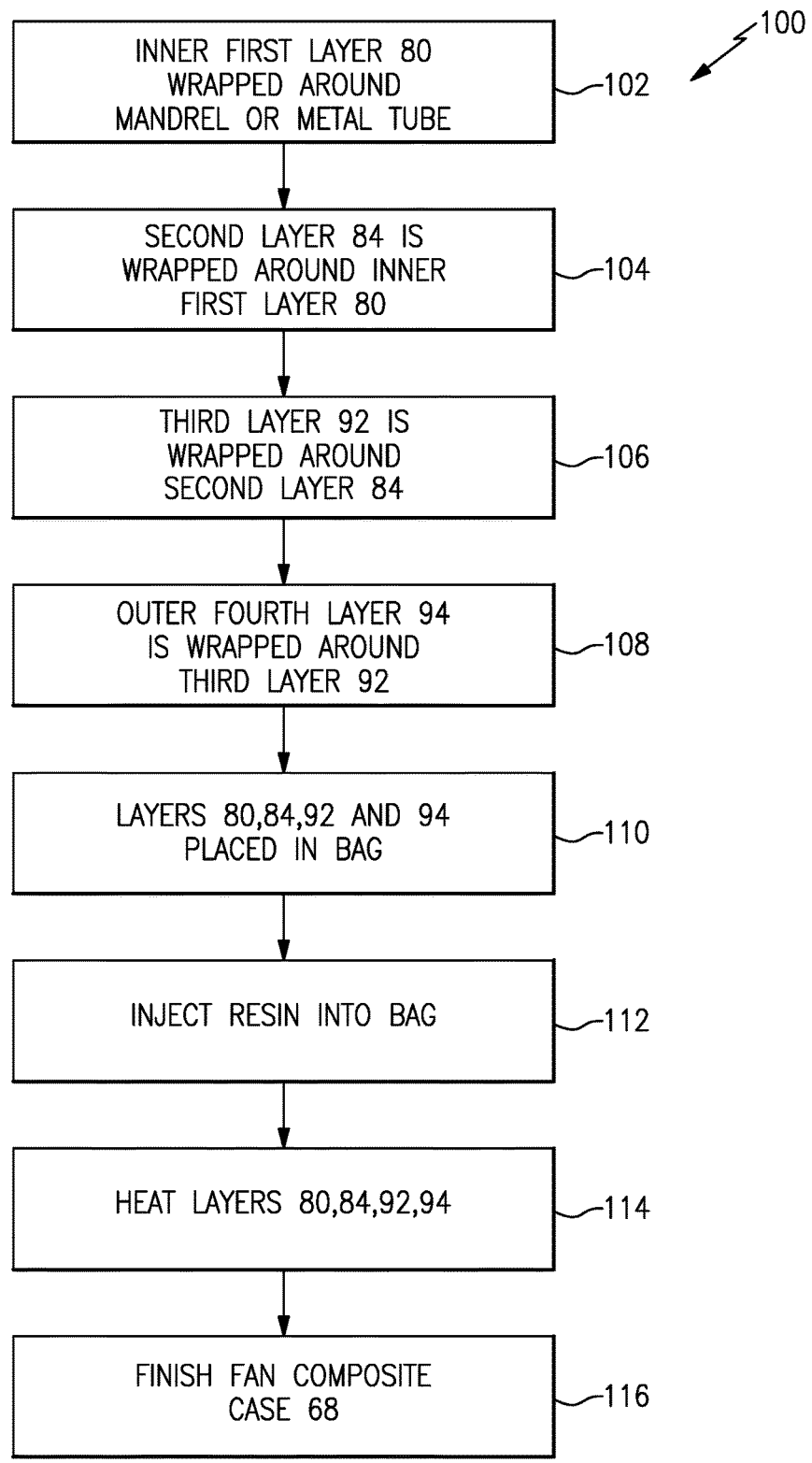
FIG. 8 illustrates a method of making a fan containment case.

FIG. 8 illustrates a method 100 of making the fan containment case 68. In step 102, the inner first layer 80 of aramid fiber is wrapped around a mandrel or metal tube. In one example, one layer of a fabric having a three dimensional weave 82 is wrapped around the mandrel or metal tube. In another example, two to three layers of fabric having a triaxial braid 86 architecture are wrapped around the mandrel or metal tube. In step 104, the second layer 84 is wrapped once around the first inner layer 80. In step 106, the third layer 92 is wrapped two to three times around the second layer 84. In step 108, the outer fourth layer 94 is wrapped several times around the third layer 92.

In step 110, the layers 80, 84, 92 and 94 are placed in a bag. In step 112, a resin is injected into the bag to wet the fabric of the layers 80, 84, 92 and 94. In step 114, the layers 80, 84, 92 and 94 are cured by heating to form the fan containment case 68. In one example, the layers 80, 84, 92 and 94 are cured in an oven. In step 116, the fan containment case 68 is removed from the mandrel or metal tube and finished by machining. In one example, the fan containment case 68 is finished to create holes.

The materials and the fabric architecture of the layers 80, 84, 92 and 94 of the fan containment case 68 can be locally tailored through the use of different composite materials and fabric architectures to produce a lighter and more structurally efficient fan containment case 68. The overall structural capability, as well as the impact and containment capability, of the fan containment case 68 can be tailored.

Additionally, locally tailoring the materials and fabric architecture in each layer 80, 84, 92 and 94 of the fan containment case 68 allows the specific structural and impact requirement of each layer 80, 84, 92 and 94 of the fan containment case 68 to provide a weight reduction. For example, the layer sequence (that is, the order the layers are "stacked" on each other), the fiber material of each layer (for example, carbon, fiberglass, aramid), the fabric architecture (for example, triaxial braid, three dimensional weave, two dimensional weave, or non-crimp fabric), the fabric design (for example, braid angle, weave type, such as orthogonal, layer-to-layer-, angle interlock), and the layer thickness (the number of wraps of the material) can be customized or locally tailored for the desired design.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A fan containment case for a gas turbine engine comprising:
   a first inner layer comprising an aramid fiber layer;
   a second layer outside the first inner layer, wherein the second layer comprises a first material having a first fabric architecture;
   a third layer outside of the second layer, wherein the third layer comprises a second material having a second fabric architecture, wherein at least one of the first material and the first fabric architecture of the second layer is different from the second material and the second fabric architecture, respectively, of the third layer; and
   a fourth outer layer outside of the third layer, wherein the fourth outer layer comprises a third fabric architecture that is different from the first and second fabric architectures;

wherein the first architecture of the second layer comprises a triaxial braid utilizing a first set of weave angles, and the second architecture of the third layer comprises a triaxial braid utilizing a second set of weave angles that is different than the first set of weave angles.

2. The fan containment case as recited in claim 1, wherein the first inner layer comprises a fabric architecture of a three dimensional weave.

3. The fan containment case as recited in claim 1, wherein the first material of the second layer comprises a hybrid carbon-fiberglass.

4. The fan containment case as recited in claim 1, wherein the triaxial braid of the second layer includes first fibers, second fibers and third fibers, and the second fibers and third fibers extend at weave angles of about +/−60° relative to the first fibers.

5. The fan containment case as recited in claim 4, wherein the first fibers are carbon fibers, and the second fibers and the third fibers are fiberglass fibers.

6. The fan containment case as recited in claim 1, wherein the second material of the third layer is carbon.

7. The fan containment case as recited in claim 1, wherein the triaxial braid of the third layer includes first fibers, second fibers and third fibers, and the second fibers and third fibers extend at weave angles of about +/−45° relative to the first fibers.

8. The fan containment case as recited in claim 7, wherein the first fibers, the second fibers and the third fibers are carbon fibers.

9. The fan containment case as recited in claim 1, wherein the fourth outer layer comprises a fabric architecture of a non-crimp fabric.

10. The fan containment case as recited in claim 1, wherein a magnitude of non-zero weave angles of the second weave angle set is less than a magnitude of non-zero weave angles of the first weave angle set.

11. A fan containment case for a gas turbine engine comprising:
a first inner layer comprising an aramid fiber;
a second layer outside the first inner layer, wherein the second layer comprises a hybrid carbon-fiberglass having a first fabric architecture;
a third layer outside of the second layer, wherein the third layer comprises carbon and has a second fabric architecture, and the first fabric architecture is different from the second fabric architecture; and
a fourth outer layer outside of the third layer, wherein the fourth outer layer comprises a third fabric architecture that is different from the first and second fabric architectures;

wherein the first architecture of the second layer comprises a triaxial braid utilizing a first set of weave angles, and the second architecture of the third layer comprises a triaxial braid utilizing a second set of weave angles that is different than the first set of weave angles.

12. The fan containment case as recited in claim 11, wherein the triaxial braid of the second layer includes first fibers, second fibers and third fibers, and the second fibers and third fibers extend at weave angles of about +/−60° relative to the first fibers.

13. The fan containment case as recited in claim 12, wherein the first fibers are carbon fibers, and the second fibers and the third fibers are fiberglass fibers.

14. The fan containment case as recited in claim 11, wherein the triaxial braid of the third layer includes first fibers, second fibers and third fibers, and the second fibers and third fibers extend at weave angles of about +/−45° relative to the first fibers.

15. The fan containment case as recited in claim 14, wherein the first fibers, the second fibers and the third fibers are carbon fibers.

16. The fan containment case as recited in claim 11, wherein the first inner layer comprises a fabric architecture of a three dimensional weave.

17. The fan containment case as recited in claim 11, wherein the fourth outer layer comprises a fabric architecture of a non-crimp fabric.

18. The fan containment case as recited in claim 11, wherein a magnitude of non-zero weave angles of the second fabric architecture is less than a magnitude of non-zero weave angles of the first fabric architecture.

19. A fan containment case for a gas turbine engine comprising:
a first inner layer comprising an aramid fiber and having a triaxial braid, two-dimensional weave, or three-dimensional weave fabric architecture;
a second layer outside the first inner layer, wherein the second layer comprises a triaxial braid that includes first, second, and third fibers, the second and third fibers utilizing weave angles of about +/−x relative to the first fibers;
a third layer outside of the second layer, wherein the third layer comprises a triaxial braid that includes first, second, and third fibers, the second and third fibers utilizing weave angles of about +/−y relative to the first fibers, wherein y<x; and
a fourth outer layer outside of the third layer and comprising a non-crimp fabric or a triaxial braid.

* * * * *